US012731793B2

(12) United States Patent
Norwich

(10) Patent No.: US 12,731,793 B2
(45) Date of Patent: Sep. 8, 2026

(54) BATTERY CELL WITH VARIABLE THICKNESS CURRENT COLLECTORS

(71) Applicant: Schaeffler Technologies AG & Co. KG, Herzogenaurach (DE)

(72) Inventor: Victor Norwich, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 693 days.

(21) Appl. No.: 18/119,231

(22) Filed: Mar. 8, 2023

(65) Prior Publication Data

US 2024/0304823 A1 Sep. 12, 2024

(51) Int. Cl.
*H01M 4/70* (2006.01)
*H01M 50/46* (2021.01)
*H01M 50/463* (2021.01)

(52) U.S. Cl.
CPC ............ *H01M 4/70* (2013.01); *H01M 50/46* (2021.01); *H01M 50/463* (2021.01)

(58) Field of Classification Search
None
See application file for complete search history.

(56) References Cited

U.S. PATENT DOCUMENTS

2022/0247048 A1 * 8/2022 Ohta .................. H01M 50/583

FOREIGN PATENT DOCUMENTS

JP 2006085921 A * 3/2006

OTHER PUBLICATIONS

JP-2006085921-A English machine translation (Year: 2006).*

* cited by examiner

*Primary Examiner* — Scott J. Chmielecki
(74) *Attorney, Agent, or Firm* — Davidson Kappel LLC

(57) ABSTRACT

A battery cell includes an anode current collector, an anode material layer on the anode current collector, a cathode current collector, a cathode material layer on the cathode current collector, and a separator sandwiched between the anode material layer and the cathode material layer. Each of the anode current collector, the anode material layer, the cathode current collector, the cathode material layer and the separator including a first side edge. Each of the anode current collector, the anode material layer, the cathode current collector, the cathode material layer and the separator including a second side edge. The anode current collector and the cathode current collector each have a tapered shape, with the second side edge of the anode current collector being thicker than the first side edge of the anode current collector and the first side edge of the cathode current collector being thicker than the second side edge of the cathode current collector.

20 Claims, 2 Drawing Sheets

BATTERY CELL WITH VARIABLE THICKNESS CURRENT COLLECTORS

TECHNICAL FIELD

The present disclosure relates generally to electric vehicle batteries and more specifically to current collectors for electric vehicle batteries.

BACKGROUND

Battery cells for electric vehicle batteries use current collectors having a uniform thickness.

SUMMARY

A battery cell includes an anode current collector, an anode material layer on the anode current collector, a cathode current collector, a cathode material layer on the cathode current collector, and a separator sandwiched between the anode material layer and the cathode material layer. Each of the anode current collector, the anode material layer, the cathode current collector, the cathode material layer and the separator including a first side edge. Each of the anode current collector, the anode material layer, the cathode current collector, the cathode material layer and the separator including a second side edge. The anode current collector and the cathode current collector each have a tapered shape, with the second side edge of the anode current collector being thicker than the first side edge of the anode current collector and the first side edge of the cathode current collector being thicker than the second side edge of the cathode current collector.

BRIEF DESCRIPTION OF THE DRAWINGS

The present disclosure is described below by reference to the following drawings, in which.

DETAILED DESCRIPTION

Figure 1:
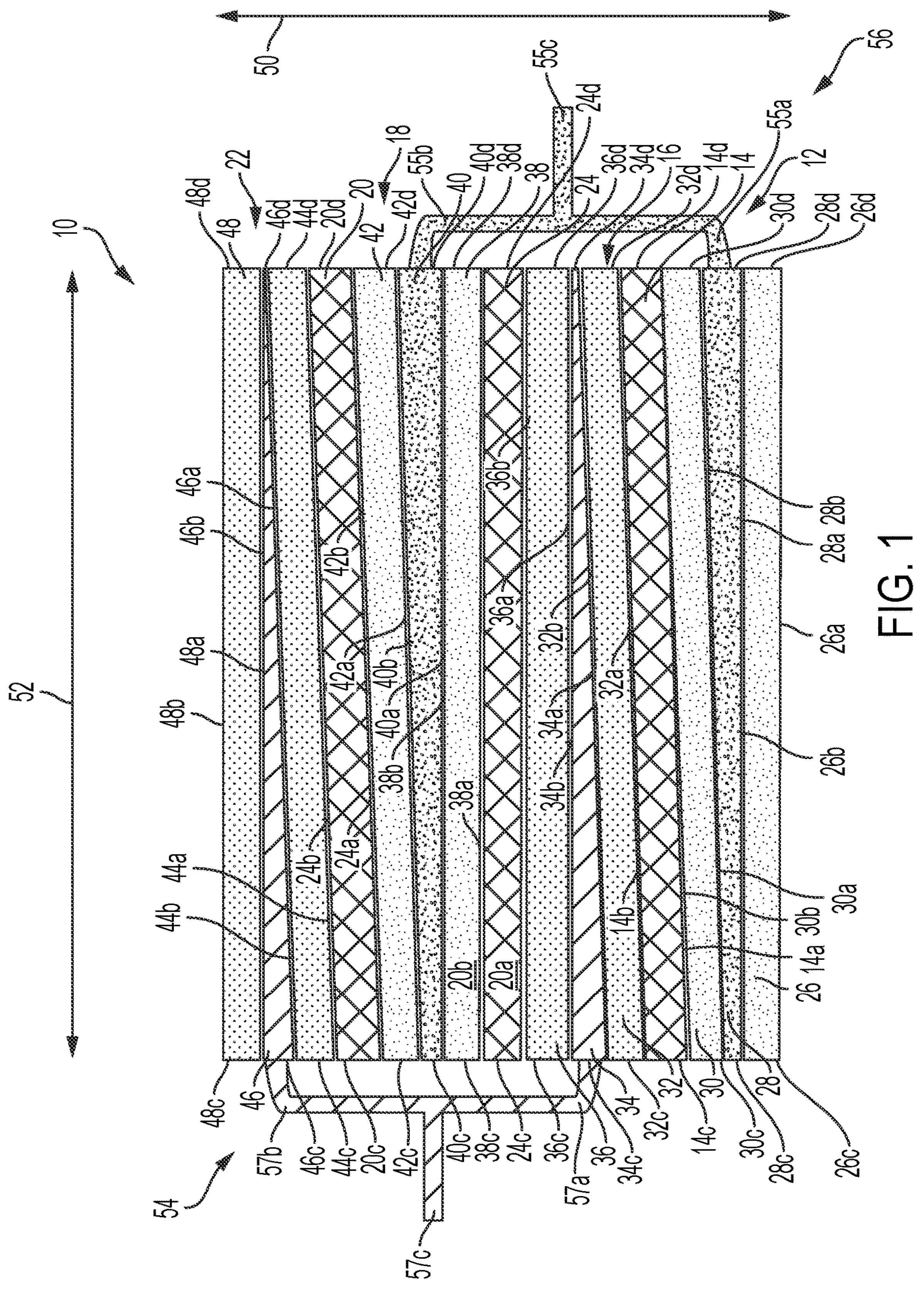
FIG. 1 shows a battery cell according to the present disclosure.

FIG. 1 shows a battery cell 10 including a first anode 12, a first separator 14, a first cathode 16, a second anode 18, a second separator 20, a second cathode 22 and a third separator 24.

The first anode 12 includes a first anode material layer 26, an anode current collector 28 and a second anode material layer 30. The first cathode 16 includes a first cathode material layer 32, a cathode current collector 34 and second cathode material layer 36. The second anode 18 includes a first anode material layer 38, an anode current collector 40 and a second anode material layer 42. The second cathode 22 includes a first cathode material layer 44, a cathode current collector 46 and second cathode material layer 48.

In order to allow battery cell 10 to have a decreased thickness in comparison with conventional battery assemblies including current collectors having uniform thicknesses, current collectors 28, 34, 40, 46 have a tapered shape. This arrangement can also advantageously generate less heat than current collectors having uniform thicknesses due to the terminal end being thicker and thus accommodating current flow in a manner that generates less heat, in comparison with a current collector having a uniform thickness and being of the same mass.

The first anode material layer 26 of first anode 12 includes a first planar surface 26*a* and a second planar surface 26*b* each extending between a first side edge 26*c* and a second side edge 26*d* of the first anode material layer 26. The first planar surface 26*a* and the second planar surface 26*b* face in opposite directions as each other and the first side edge 26*c* and the second side edge 26*d* face in opposite directions as each other. The anode current collector 28 includes a first planar surface 28*a* and a second planar surface 28*b* each extending between a first side edge 28*c* and a second side edge 28*d* of the anode current collector 28. The first planar surface 28*a* and the second planar surface 28*b* face in opposite directions as each other and the first side edge 28*c* and the second side edge 28*d* face in opposite directions as each other. The second anode material layer 30 includes a first planar surface 30*a* and a second planar surface 30*b* each extending between a first side edge 30*c* and a second side edge 30*d* of the second anode material layer 30. The first planar surface 30*a* and the second planar surface 30*b* face in opposite directions as each other and the first side edge 30*c* and the second side edge 30*d* face in opposite directions as each other.

The first cathode material layer 32 of first cathode 16 includes a first planar surface 32*a* and a second planar surface 32*b* each extending between a first side edge 32*c* and a second side edge 32*d* of the first cathode material layer 32. The first planar surface 32*a* and the second planar surface 32*b* face in opposite directions as each other and the first side edge 32*c* and the second side edge 32*d* face in opposite directions as each other. The cathode current collector 34 includes a first planar surface 34*a* and a second planar surface 34*b* each extending between a first side edge 34*c* and a second side edge 34*d* of the cathode current collector 34. The first planar surface 34*a* and the second planar surface 34*b* face in opposite directions as each other and the first side edge 34*c* and the second side edge 34*d* face in opposite directions as each other. The second cathode material layer 36 includes a first planar surface 36*a* and a second planar surface 36*b* each extending between a first side edge 36*c* and a second side edge 36*d* of the second cathode material layer 36. The first planar surface 36*a* and the second planar surface 36*b* face in opposite directions as each other and the first side edge 36*c* and the second side edge 36*d* face in opposite directions as each other.

The first anode material layer 38 of second anode 18 includes a first planar surface 38*a* and a second planar surface 38*b* each extending between a first side edge 38*c* and a second side edge 38*d* of the first anode material layer 38. The first planar surface 38*a* and the second planar surface 38*b* face in opposite directions as each other and the first side edge 38*c* and the second side edge 38*d* face in opposite directions as each other. The anode current collector 40 includes a first planar surface 40*a* and a second planar surface 40*b* each extending between a first side edge 40*c* and a second side edge 40*d* of the anode current collector 40. The first planar surface 40*a* and the second planar surface 40*b* face in opposite directions as each other and the first side edge 40*c* and the second side edge 40*d* face in opposite directions as each other. The second anode material layer 42 includes a first planar surface 42*a* and a second planar surface 42*b* each extending between a first side edge 42*c* and a second side edge 42*d* of the second anode material layer 42. The first planar surface 42*a* and the second planar surface 42*b* face in opposite directions as each other and the first side edge 42*c* and the second side edge 42*d* face in opposite directions as each other.

The first cathode material layer 44 of second cathode 22 includes a first planar surface 44*a* and a second planar surface 44*b* each extending between a first side edge 44*c* and a second side edge 44*d* of the first cathode material layer 44. The first planar surface 44*a* and the second planar surface 44*b* face in opposite directions as each other and the first side edge 44*c* and the second side edge 44*d* face in opposite directions as each other. The cathode current collector 46 includes a first planar surface 46*a* and a second planar surface 46*b* each extending between a first side edge 46*c* and a second side edge 46*d* of the cathode current collector 46. The first planar surface 46*a* and the second planar surface 46*b* face in opposite directions as each other and the first side edge 46*c* and the second side edge 46*d* face in opposite directions as each other. The second cathode material layer 48 includes a first planar surface 48*a* and a second planar surface 48*b* each extending between a first side edge 48*c* and a second side edge 48*d* of the second cathode material layer 48. The first planar surface 48*a* and the second planar surface 48*b* face in opposite directions as each other and the first side edge 48*c* and the second side edge 48*d* face in opposite directions as each other.

Anode material layers 26, 30, 38, 42 can each be a lithium metal. Lithium metals forming the anode material 26 can include lithium iron phosphate (LFP), lithium nickel cobalt aluminum oxide (NCA), lithium nickel manganese cobalt oxide (NMC), lithium cobalt oxide (LCO) and lithium manganese oxide (LMO).

Anode material layers 32, 36, 44, 48 can be lithium iron phosphate (LFP), lithium nickel cobalt aluminum oxide (NCA), lithium nickel manganese cobalt oxide (NMC), lithium cobalt oxide (LCO), lithium manganese oxide (LMO), lithium titanate (LTO), nickel cobalt aluminum oxide (NCA) or nickel cobalt manganese (NCM).

Anode current collectors 28, 40 can be formed of copper foil and cathode current collectors 34, 46 can be formed of aluminum foil.

Separators 14, 20, 24 can be saturated in a liquid electrolyte or can be a solid state electrolyte. Separator 14 includes a first planar surface 14*a* and a second planar surface 14*b* each extending between a first side edge 14*c* and a second side edge 14*d*. Separator 20 includes a first planar surface 20*a* and a second planar surface 20*b* each extending between a first side edge 20*c* and a second side edge 20*d*. Separator 24 includes a first planar surface 24*a* and a second planar surface 24*b* each extending between a first side edge 24*c* and a second side edge 24*d*.

Battery cell 10, as shown in FIG. 1, has a thickness 50 and a width 52. Battery cell 10 further includes a length extending into the page. Each of the layers of battery cell 10 also has a thickness, width and length, with the thickness being defined between the respective planar surfaces denoted in FIG. 1, and the width being defined between the respective side edges. For example, the length can be the same as the width for each layer, and the width and length of each layer is at least 4000 times the thickness. Thickness 50 of battery cell 10 is defined by first planar surface 26*a* of first anode material layer 26 and second planar surface 48*b* of second cathode material layer 48. Battery cell 10 has a uniform thickness. Width 52 is defined by a first side 54 and a second side 56 of battery cell 10. First side 54 is defined by the first side edges of the layers and second side 56 is defined by the second edges of the layers.

The anode current collectors 28, 40 and the cathode current collectors 34, 46 each have a tapered shape, with the second side edge 28*d*, 40*d* of each of the anode current collectors 28, 40 being thicker than the first side edge 28*c*, 40*c* of the respective anode current collectors 28, 40 and the second side edge 34*d*, 46*d* of each of the cathode current collectors 34, 46 being thicker than the first side edge 34*a*, 46*a* of the respective cathode current collector 34, 46. The thickness of anode current collectors 28, 40 continuously decreases while extending from the second side edge 28*d*, 40*d* to the first side edge 28*c*, 40*c*, and thickness of cathode current collectors 34, 46 continuously decreases while extending from the first side edge 34*a*, 46*a* to the second side edge 34*d*, 46*d*. In particular, current collectors 28, 34, 40, 46 each have a wedge shape, with the second planar surfaces 28*b*, 40*c* of the anode current collectors 28, 40 being inclined with respect to the respective planar 28*a*, 34*a*, 40*a*, 46*a*.

More specifically, the second planar surfaces 28*b*, 40*c* of the anode current collectors 28, 40 are at a non-zero angle with respect to the respective first planar surface 28*a*, 40*a*, and the first planar surfaces 34*a*, 46*a* of the cathode current collectors 34, 46 are at a non-zero angle with respect to the respective second planar surface 34*b*, 46*b*. In order to allow battery cell 10 to have a uniform thickness, the second planar surfaces 28*b*, 40*c* of the anode current collectors 28 face in opposite directions as the first planar surfaces 34*a*, 46*a* of the cathode current collectors 34, 46 and all of planar surfaces 28*b*, 40*c*, 34*a*, 46*a* have the same incline. The non-zero angle formed by the first planar surfaces 28*a*, 40*a* and second planar surfaces 28*b*, 40*b* of the anode current collectors 28, 40 and the non-zero angle formed by the first planar surfaces 34*a*, 46*a* and second planar surfaces 34*b*, 46*b* of the cathode current collector 34, 46 can each be a same angle.

Due to the incline of surfaces planar surfaces 28*b*, 40*c*, 34*a*, 46*a* of the current collectors 28, 40, 34, 46, the planar surfaces of second anode material layers 30, 42, first cathode layers 32, 44 and separators 14, 20 are also inclined (i.e., at a non-zero angle) with respect to the top electrode surface (planar surface 48*b*) and bottom electrode surface (planar surface 26*a*) of battery cell 10. As the top electrode surface and bottom electrode surface are also parallel to first planar surfaces 28*a*, 40*a* of anode current collectors 28, 40 and second planar surfaces 34*b*, 46*b* of cathode current collectors 34, 46, the planar surfaces of second anode material layers 30, 42, first cathode layers 32, 44 and separators 14, 20 are also inclined (i.e., at a non-zero angle) with respect to also inclined with respect to the first planar surfaces 28*a*, 40*a* of anode current collectors 28, 40 and second planar surfaces 34*b*, 46*b* of cathode current collectors 34, 46.

In particular, first planar surfaces 30*a*, 42*a* of anode material layers 30, 42, which contact respective second planar surfaces 28*b*, 40*b* of anode current collectors 28, 40, are inclined with respect to first planar surfaces 28*a*, 40*a* of anode current collectors 28, 40 and second planar surfaces 34*b*, 46*b* of cathode current collectors 34, 46, and are also inclined with respect to the top electrode surface (planar surface 48*b*) and bottom electrode surface (planar surface 26*a*) of battery cell 10. Second planar surfaces 30*b*, 42*b* of anode material layers 30, 42, which contact respective first planar surfaces 14*a*, 24*a* of separators 14, 20, are also inclined with respect to first planar surfaces 28*a*, 40*a* of anode current collectors 28, 40 and second planar surfaces 34*b*, 46*b* of cathode current collectors 34, 46, and are inclined with respect to the top electrode surface and bottom electrode surface of battery cell 10.

First planar surfaces 32*a*, 44*a* of cathode material layers 32, 44, which contact respective second planar surfaces 14*b*, 24*b* of separators 14, 20, are inclined with respect to first planar surfaces 28*a*, 40*a* of anode current collectors 28, 40 and second planar surfaces 34*b*, 46*b* of cathode current collectors 34, 46, and are also inclined with respect to the top electrode surface (planar surface 48*b*) and bottom electrode surface (planar surface 26*a*) of battery cell 10. Second planar surfaces 32*b*, 44*b* of cathode material layers 32, 44, which contact respective first planar surfaces 34*a*, 46*a* of cathode current collectors 34, 46, are also inclined with respect to first planar surfaces 28*a*, 40*a* of anode current collectors 28, 40 and second planar surfaces 34*b*, 46*b* of cathode current collectors 34, 46, and are also inclined with respect to the top electrode surface and bottom electrode surface of battery cell 10.

First planar surfaces 14*a*, 24*a* and second planar surfaces 14*b*, 24*b* of separators 14, 24 are inclined with respect to first planar surfaces 28*a*, 40*a* of anode current collectors 28, 40 and second planar surfaces 34*b*, 46*b* of cathode current collectors 34, 46, and are also inclined with respect to the top electrode surface (planar surface 48*b*) and bottom electrode surface (planar surface 26*a*) of battery cell 10.

In contrast, planar surfaces 26*b*, 38*a*, 38*b* of first anode material layers 26, 38, planar surfaces 36*a*, 36*b*, 48*a* of second cathode layers 36, 48 and the planar surfaces 24*a*, 24*b* of separator 24 are parallel to the top surface (planar surface 48*b*) and bottom surface (planar surface 26*a*) of battery cell 10, and are inclined with respect to the first planar surfaces 28*a*, 40*a* of anode current collectors 28, 40 and second planar surfaces 34*b*, 46*b* of cathode current collectors 34, 46.

Battery cell 10 further includes a first anode tab 55*a* extending from the second side edge 28*d* of the first anode current collector 28, a second anode tab 55*b* extending from the second side edge 40*d* of the second anode current collector 40, a first cathode tab 57*a* extending from the first side edge 34*c* of the first cathode current collector 34 and a second cathode tab 57*b* extending from the first side edge 46*c* of the second cathode current collector 46. The first anode tab 55*a* and the second anode tab 55*b* are joined together to form an anode terminal 55*c* and the cathode anode tab 57*a* and the second cathode tab 57*b* are joined together to form a cathode terminal 57*c*

Figure 2:
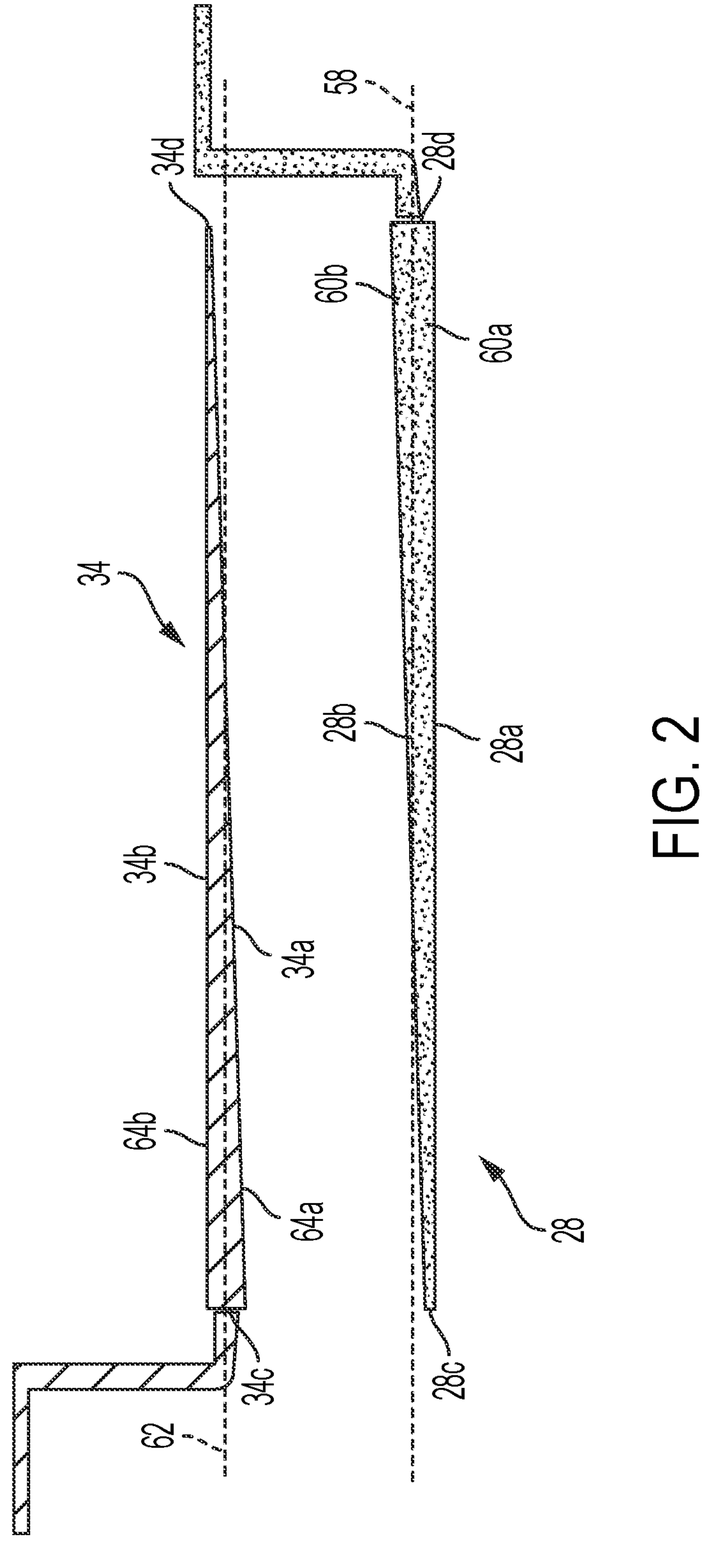
FIG. 2 shows one of the anode current collectors and one of the cathode current collectors of the battery cell shown in FIG. 1.

As illustrated in FIG. 2 by for example current collectors 28, 34, current collectors 28, 34, 40, 46 each have an asymmetrical thickness. The anode current collector 28 is intersected by a first plane 58 extending from midway the second side edge 28*d* and parallel to the first planar surface 28*a* of the anode current collector 28. The first plane 58 divides the anode current collector 28 into a first section 60*a* and a second section 60*b*. The first section 60*a* and the second section 60*b* are asymmetrical with respect to the first plane 58. Similarly, the cathode current collector 34 is intersected by a second plane 62 extending from midway the first side edge 34*c* and parallel to the second planar surface 34*b* of the cathode current collector 34. The second plane 62 divides the cathode current collector 34 into a first section 64*a* and a second section 64*b*. The first section 64*a* and the second section 64*b* of the cathode current collector 64 are asymmetrical with respect to the second plane 62.

Anode current collector 40 is configured in the same manner as anode current collector 28 and cathode current collector 46 is configured in the same manner as cathode current collector 34. Thus, the anode current collector 40 is intersected by a third plane extending from midway the second side edge 40*d* and parallel to the first planar surface 40*a* of the anode current collector 40, with the third plane dividing the anode current collector 40 into a first section and a second section that are asymmetrical with respect to the third plane. Also, the cathode current collector 46 is intersected by a fourth plane extending from midway the first side edge 46*c* and parallel to the second planar surface 46*b* of the cathode current collector 46, with the fourth plane dividing the cathode current collector 46 into a first section and a second section that are asymmetrical with respect to the fourth plane.

The first planar surface 28*a* of the anode current collector 28 is parallel to and facing away from the second planar surface 34*b* of the cathode current collector 34.

In the preceding specification, the present disclosure has been described with reference to specific exemplary embodiments and examples thereof. It will, however, be evident that various modifications and changes may be made thereto without departing from the broader spirit and scope of present disclosure as set forth in the claims that follow. The specification and drawings are accordingly to be regarded in an illustrative manner rather than a restrictive sense.

LIST OF REFERENCE CHARACTERS

10 battery cell
12 first anode
14 separators
14*a* first planar surface
14*b* second planar surface
14*c* first side edge
14*d* second side edge
16 first cathode
18 second anode
20 separators
20*a* first planar surface
20*b* second planar surface
20*c* first side edge
20*d* second side edge
22 second cathode
24 separators
24*a* first planar surface
24*b* second planar surface
24*c* first side edge
24*d* second side edge
26 first anode material layer
26*a* planar surface
26*b* second planar surface
26*c* first side edge
26*d* second side edge
28 anode current collectors
28*a* first planar surfaces
28*b* second planar surfaces
28*c* first side edge
28*d* second side edge
30 second anode material layer
30*a* first planar surface
30*b* second planar surface
30*c* first side edge
30*d* second side edge
32 first cathode material layer
32*a* first planar surface
32*b* second planar surface
32*c* first side edge
32*d* second side edge
34 cathode current collectors
34*a* first planar surfaces
34*b* second planar surfaces
34*c* first side edge
34*d* second side edge

36 second cathode material layer
36*a* first planar surface
36*b* second planar surface
36*c* first side edge
36*d* second side edge
38 first anode material layer
38*a* first planar surface
38*b* second planar surface
38*c* first side edge
38*d* second side edge
40 anode current collectors
40*a* first planar surfaces
40*b* second planar surface
40*c* first side edge
40*d* second side edge
42 second anode material layer
42*a* first planar surface
42*b* second planar surface
42*c* first side edge
42*d* second side edge
44 first cathode material layer
44*a* first planar surface
44*b* second planar surface
44*c* first side edge
44*d* second side edge
46 cathode current collectors
46*a* first planar surfaces
46*b* second planar surfaces
46*c* first side edge
46*d* second side edge
48 second cathode material layer
48*a* first planar surface
48*b* planar surface
48*c* first side edge
48*d* second side edge
50 thickness
52 width
54 first side
55*a* first anode tab
55*b* second anode tab
55*c* anode terminal
56 second side
57*a* first cathode tab
57*b* second cathode tab
57*c* cathode terminal
58 first plane
60*a* first section
60*b* second section
62 second plane
64 cathode current collector
64*a* first section
64*b* second section

What is claimed is:

1. A battery cell comprising:

an anode current collector;

an anode material layer on the anode current collector;

a cathode current collector;

a cathode material layer on the cathode current collector;

a separator sandwiched between the anode material layer and the cathode material layer, a second anode current collector;

a second anode material layer on the second anode current collector;

a second cathode current collector;

a second cathode material layer on the second cathode current collector;

a second separator sandwiched between the second anode material layer and the cathode material layer; and a third separator sandwiched between the anode material layer and the second cathode material layer, the anode current collector and the cathode current collector being between the second anode current collector and the second cathode current collector relative to a direction of a thickness of the battery cell, each of the anode current collector, the anode material layer, the cathode current collector, the cathode material layer and the separator including a first side edge, each of the anode current collector, the anode material layer, the cathode current collector, the cathode material layer and the separator including a second side edge, the anode current collector and the cathode current collector each having a tapered shape, with the second side edge of the anode current collector being thicker than the first side edge of the anode current collector and the first side edge of the cathode current collector being thicker than the second side edge of the cathode current collector.

2. The battery cell as recited in claim 1 wherein the first side edge of each of the anode current collector, the anode material layer, the cathode current collector, the cathode material layer and the separator define a first side of the battery cell, the second side edge of each of the anode current collector, the anode material layer, the cathode current collector, the cathode material layer and the separator defining a second side of the battery cell.

3. The battery cell as recited in claim 1 wherein the battery cell has a uniform thickness.

4. The battery cell as recited in claim 1 further comprising an anode tab extending from the first side edge of the anode current collector, and a cathode tab extending from the second side edge of the cathode current collector.

5. The battery cell as recited in claim 1 wherein the anode current collector includes a first planar surface extending from the first side edge to the second side edge of the anode current collector and a second planar surface extending from the first side edge to the second side edge of the anode current collector, the first planar surface and the second planar surface of the anode current collector facing in opposite directions, the cathode current collector including a first planar surface extending from the first side edge to the second side edge of the cathode current collector and a second planar surface extending from the first side edge to the second side edge of the cathode current collector, the first planar surface and the second planar surface of the cathode current collector facing in opposite directions, the first planar surface of the anode current collector and the second planar surface of the cathode current collector facing in opposite directions and being parallel to each other, the second planar surface of the anode current collector being at a non-zero angle with respect to the first planar surface of the anode current collector, the first planar surface of the cathode current collector being at a non-zero angle with respect to the second planar surface of the cathode current collector.

6. The battery cell as recited in claim 5 wherein the non-zero angle formed by the first and second planar surfaces of the anode current collector and the non-zero angle formed by the first and second planar surfaces of the cathode current collector are equal to each other.

7. The battery cell as recited in claim 5 wherein the anode material layer includes a first planar surface extending from the first side edge to the second side edge of the anode material layer and a second planar surface extending from the first side edge to the second side edge of the anode material layer, the first planar surface and the second planar surface of the anode material layer facing in opposite directions, the first planar surface of the anode material layer contacting the second planar surface of the anode current collector, the first and second planar surfaces of the anode material layer being at a non-zero angle with respect to the first planar surface of the anode current collector.

8. The battery cell as recited in claim 7 wherein the cathode material layer includes a first planar surface extending from the first side edge to the second side edge of the cathode material layer and a second planar surface extending from the first side edge to the second side edge of the cathode material layer, the first planar surface and the second planar surface of the cathode material layer facing in opposite directions, the second planar surface of the cathode material layer contacting the first planar surface of the cathode current collector, the first and second planar surfaces of the cathode material layer being at a non-zero angle with respect to the second planar surface of the cathode current collector.

9. The battery cell as recited in claim 8 wherein the separator includes a first planar surface extending from the first side edge to the second side edge of the separator and a second planar surface extending from the first side edge to the second side edge of the separator, the first planar surface and the second planar surface of the separator facing in opposite directions, the first planar surface of the separator contacting the second planar surface of the anode material layer, the second planar surface of the separator contacting the first planar surface of the cathode material layer, the first and second planar surfaces of the separator being at a non-zero angle with respect to the first planar surface of the anode current collector and to the second planar surface of the cathode current collector.

10. The battery cell as recited in claim 5 further comprising an additional anode material layer on the first planar surface of the anode current collector, the additional anode material layer including a first planar surface extending from a first side edge to a second side edge of the additional anode material layer and a second planar surface extending from the first side edge to the second side edge of the additional anode material layer, the first planar surface and the second planar surface of the additional anode material layer facing in opposite directions and being parallel to the first planar surface of the anode current collector and the second planar surface of the cathode current collector.

11. The battery cell as recited in claim 10 further comprising an additional cathode material layer on the second planar surface of the cathode current collector, the additional cathode material layer including a first planar surface extending from a first side edge to a second side edge of the additional cathode material layer and a second planar surface extending from the first side edge to the second side edge of the additional cathode material layer, the first planar surface and the second planar surface of the additional cathode material layer facing in opposite directions and being parallel to the first planar surface of the anode current collector and the second planar surface of the cathode current collector.

12. A battery cell comprising:

a first anode including an anode current collector, a first anode material layer and a second anode material layer;

a first cathode including a cathode current collector, a first cathode material layer and a second cathode material layer; and a first separator between the first anode and the first cathode configured to enable a transfer of ions between the first anode and the first cathode, the anode current collector including a first side edge, a second side edge opposite of the first side edge, a first planar surface extending from the first side edge to the second side edge, and a second planar surface opposite of the first planar surface extending from the first side edge to the second side edge; and the cathode current collector including a first side edge, a second side edge opposite of the first side edge, a first planar surface extending from the first side edge to the second side edge, and a second planar surface opposite of the first planar surface extending from the first side edge to the second side edge, the anode current collector being intersected by a first plane extending from midway the second side edge and parallel to the first planar surface of the anode current collector, the first plane dividing the anode current collector into a first section and a second section, the first section and the second section of the anode current collector being asymmetrical with respect to the first plane, the cathode current collector being intersected by a second plane extending from midway the first side edge and parallel to the second planar surface of the cathode current collector, the second plane dividing the cathode current collector into a first section and a second section, the first section and the second section of the cathode current collector being asymmetrical with respect to the second plane.

13. The battery cell as recited in claim 12 wherein the first planar surface of the anode current collector is parallel to and facing away from the second planar surface of the cathode current collector.

14. The battery cell as recited in claim 12 further comprising:

a second anode including an anode current collector, a first anode material layer and a second anode material layer;

a second cathode including a cathode current collector, a first cathode material layer and a second cathode material layer; and a second separator between the second anode and the second cathode configured to enable a transfer of ions between the second anode and the second cathode, the anode current collector of the second anode including a first side edge, a second side edge opposite of the first side edge, a first planar surface extending from the first side edge to the second side edge, and a second planar surface opposite of the first planar surface extending from the first side edge to the second side edge;

the cathode current collector of the second cathode including a first side edge, a second side edge opposite of the first side edge, a first planar surface extending from the first side edge to the second side edge, and a second planar surface opposite of the first planar surface extending from the first side edge to the second side edge, the anode current collector of the second anode being intersected by a third plane extending from midway the second side edge and parallel to the second planar surface of the anode current collector of the second anode, the third plane dividing the anode current collector of the second anode into a first section and a second section, the first section and the second section of the anode current collector of the second anode being asymmetrical with respect to the third plane, the cathode current collector of the second cathode being intersected by a fourth plane extending from midway the first side edge and parallel to the second planar surface of the cathode current collector of the second cathode, the fourth plane dividing the cathode current collector of the second cathode into a first section and a second section, the first section and the second section of the cathode current collector of the second cathode being asymmetrical with respect to the fourth plane.

15. The battery cell as recited in claim 14 wherein the anode current collector of the first anode includes a first anode tab extending from the first side edge of the anode current collector of the first anode, the anode current collector of the second anode including a second anode tab extending from the first side edge of the anode current collector of the second anode, the first anode tab and the second anode tab being joined together to form an anode terminal, the cathode current collector of the first cathode includes a first cathode tab extending from the first side edge of the cathode current collector of the first cathode, the cathode current collector of the second cathode including a second cathode tab extending from the first side edge of the cathode current collector of the second cathode, the first cathode tab and the second cathode tab being joined together to form an cathode terminal.

16. The battery cell as recited in claim 14 further comprising a third separator sandwiched between the second planar surface of the anode current collector of the first anode and the first planar surface of the cathode current collector of the second cathode.

17. The battery cell as recited in claim 12 wherein the second planar surface of the anode current collector is at a non-zero angle with respect to the first planar surface of the anode current collector, the first planar surface of the cathode current collector being at a non-zero angle with respect to the second planar surface of the cathode current collector.

18. The battery cell as recited in claim 1 wherein each of the second anode current collector, the second anode material layer, the second cathode current collector, the second cathode material layer, the second separator, and the third separator include the first side edge, each of the second anode current collector, the second anode material layer, the second cathode current collector, the second cathode material layer, the second separator, and the third separator including the second side edge, the second anode current collector and the second cathode current collector each having a tapered shaped, with the second side edge of the second anode current collector being thicker than the first side edge of the second anode current collector and the first side edge of the second cathode current collector being thicker than the second side edge of the second cathode current collector.

19. A battery cell comprising:

an anode current collector;

an anode material layer on the anode current collector;

a cathode current collector;

a cathode material layer on the cathode current collector; and a separator sandwiched between the anode material layer and the cathode material layer, each of the anode current collector, the anode material layer, the cathode current collector, the cathode material layer and the separator including a first side edge, each of the anode current collector, the anode material layer, the cathode current collector, the cathode material layer and the separator including a second side edge, the anode current collector and the cathode current collector each having a tapered shape, with the second side edge of the anode current collector being thicker than the first side edge of the anode current collector and the first side edge of the cathode current collector being thicker than the second side edge of the cathode current collector, wherein the anode current collector includes a first planar surface extending from the first side edge to the second side edge of the anode current collector and a second planar surface extending from the first side edge to the second side edge of the anode current collector, the first planar surface and the second planar surface of the anode current collector facing in opposite directions, the cathode current collector including a first planar surface extending from the first side edge to the second side edge of the cathode current collector and a second planar surface extending from the first side edge to the second side edge of the cathode current collector, the first planar surface and the second planar surface of the cathode current collector facing in opposite directions, the first planar surface of the anode current collector and the second planar surface of the cathode current collector facing in opposite directions and being parallel to each other, the second planar surface of the anode current collector being at a non-zero angle with respect to the first planar surface of the anode current collector, the first planar surface of the cathode current collector being at a non-zero angle with respect to the second planar surface of the cathode current collector, further comprising an additional anode material layer on the first planar surface of the anode current collector, the additional anode material layer including a first planar surface extending from a first side edge to a second side edge of the additional anode material layer and a second planar surface extending from the first side edge to the second side edge of the additional anode material layer, the first planar surface and the second planar surface of the additional anode material layer facing in opposite directions and being parallel to the first planar surface of the anode current collector and the second planar surface of the cathode current collector.

20. The battery cell as recited in claim 19 further comprising an additional cathode material layer on the second planar surface of the cathode current collector, the additional cathode material layer including a first planar surface extending from a first side edge to a second side edge of the additional cathode material layer and a second planar surface extending from the first side edge to the second side edge of the additional cathode material layer, the first planar surface and the second planar surface of the additional cathode material layer facing in opposite directions and being parallel to the first planar surface of the anode current collector and the second planar surface of the cathode current collector.

* * * * *